US011136921B2

(12) United States Patent
Medda et al.

(10) Patent No.: US 11,136,921 B2
(45) Date of Patent: Oct. 5, 2021

(54) AIRCRAFT PROPULSION SYSTEM INCLUDING A HEAT EXCHANGER SYSTEM

(71) Applicants: Airbus SAS, Blagnac (FR); Airbus Operations SAS, Toulouse (FR); Airbus Operations, S.L., Getafe (FR)

(72) Inventors: Bruno Medda, Tournefeuille (FR); Esteban Martino-Gonzalez, Aranjuez (ES); Thomas Stevens, Tournefeuille (FR); Julien Cayssials, Gagnac sur Garonne (FR); Juan Tomas Prieto Padilla, Madrid (ES); Adeline Soulie, Verdun sur Garonne (FR); Didier Poirier, Blagnac (FR); Pierre-Alain Pinault, Tournefeuille (FR); Diego Barron Vega, Madrid (ES)

(73) Assignees: AIRBUS OPERATIONS SAS, Toulouse (FR); AIRBUS SAS, Blagnac (FR); AIRBUS OPERATIONS S.L., Getafe (ES)

( * ) Notice: Subject to any disclaimer, the term of this patent is extended or adjusted under 35 U.S.C. 154(b) by 24 days.

(21) Appl. No.: 16/814,494

(22) Filed: Mar. 10, 2020

(65) Prior Publication Data

US 2020/0291869 A1    Sep. 17, 2020

(30) Foreign Application Priority Data

Mar. 11, 2019 (EP) .................................... 19162028

(51) Int. Cl.
*F02C 9/00* (2006.01)
*F02C 9/18* (2006.01)
*F02C 7/10* (2006.01)

(52) U.S. Cl.
CPC .................. *F02C 9/18* (2013.01); *F02C 7/10* (2013.01); *F05D 2220/323* (2013.01); *F05D 2260/20* (2013.01)

(58) Field of Classification Search
None
See application file for complete search history.

(56) References Cited

U.S. PATENT DOCUMENTS

| 6,058,725 A | 5/2000 | Monfraix et al. |
| 2012/0045317 A1 | 2/2012 | Saladino |

(Continued)

FOREIGN PATENT DOCUMENTS

| EP | 0934876 A1 | 8/1999 |
| WO | 2018002855 A1 | 1/2018 |

OTHER PUBLICATIONS

European Search Report; priority document.

*Primary Examiner* — Edwin Kang
(74) *Attorney, Agent, or Firm* — Greer, Burns & Crain, Ltd.

(57) ABSTRACT

An aircraft propulsion system, including a turbojet and a heat exchanger system which includes a main heat exchanger, a hot air supply pipe, a transfer pipe transferring hot air to an air management system, a main supply pipe supplying cold air from the fan duct, an evacuation pipe expelling air to the outside, a sub heat exchanger with a high pressure pipe going therethrough, a sub supply pipe supplying cold air and including a sub regulating valve, a sub evacuation pipe expelling air, a temperature sensor, and a controller controlling the system according to the temperature measured The sub regulating valve comprises a door articulated between closed and open positions, a return spring constraining the door in the open position, and a realizing system, controlled by the controller, mobile (Continued)

between a blocking position and a realizing position in which the door is released to move to the open position.

3 Claims, 3 Drawing Sheets

(56) References Cited

U.S. PATENT DOCUMENTS

| | | | |
|---|---|---|---|
| 2015/0247463 A1* | 9/2015 | DeFrancesco | B64D 13/08 60/782 |
| 2016/0369705 A1* | 12/2016 | Mackin | F02C 6/08 |
| 2018/0128176 A1* | 5/2018 | Staubach | F02K 3/115 |
| 2019/0202567 A1 | 7/2019 | Epp et al. | |
| 2019/0285324 A1* | 9/2019 | Valiquette | B64D 13/06 |

\* cited by examiner

AIRCRAFT PROPULSION SYSTEM INCLUDING A HEAT EXCHANGER SYSTEM

CROSS-REFERENCES TO RELATED APPLICATIONS

This application claims the benefit of the European patent application No. 19162028.5 filed on Mar. 11, 2019, the entire disclosures of which are incorporated herein by way of reference.

FIELD OF THE INVENTION

The present invention relates to an aircraft propulsion system including a heat exchanger system, together with an aircraft including at least one such propulsion system.

BACKGROUND OF THE INVENTION

In order to supply hot air whether for a system of air, conditioned so as to guarantee the comfort of the passengers, or for a de-icing system for de-icing the outside surfaces of an aircraft, this system includes a heat exchanger system, which is schematically illustrated in FIG. 4.

The heat exchanger system 500 is disposed in the vicinity of the turbojet of the aircraft and includes a heat exchanger 502. The turbojet is fixed to the structure of the wing due to a pylon, and the heat exchanger 502 is located between the pylon and the pylon fairing.

The heat exchanger 502 is supplied with hot air through a first supply pipe 504, which bleeds hot air from the high-pressure stage 506 or at the intermediate pressure stage 508 of the turbojet, respectively through a first valve 510 and a second valve 512. The first supply pipe 504 also includes a regulating valve 514, which enables regulation of the pressure at the inlet of the heat exchanger 502.

The heat exchanger 502 is supplied with cold air by a second supply pipe 516, which bleeds cold air from the fan duct of the turbojet. The second supply pipe 516 also includes a regulating valve 518, which regulates the quantity of cold air introduced into the heat exchanger 502 so as to regulate the temperature of the hot air exiting the heat exchanger 502.

After having passed through the heat exchanger 502, the cold air, which has been heated, is expelled to the outside through an evacuation pipe 520.

After having passed through the heat exchanger 502, the hot air, which has been cooled, is directed through a transfer pipe 522 to the air management systems like the air conditioning system or the de-icing system.

The heat exchanger system 500 includes a temperature sensor 523, which measures the temperature of the hot air exiting the heat exchanger 502 and a control unit 524, or controller, which controls the valves according to the temperature measured by the temperature sensor 523 and the temperature desired for the hot air exiting the heat exchanger 502.

The heat exchanger 502 is with cross flow, that is to say, the hot air and the cold air enter the heat exchanger 502 and exit the heat exchanger 502 along two globally perpendicular directions.

In case the temperature sensor 523 detects that the temperature increases abnormally, it is necessary to regulate the flow of hot air flowing in the heat exchanger 502. The actual solution is to oversize the heat exchanger 502, but in this case, it is heavier and takes more space.

EP-A-0 934 876, US-A-2012/045317 and WO-A-2018/002855 disclose propulsion systems of the state of the art.

The size of the turbojet increases due to the necessity to increase the bypass ratio and the overall pressure ratio. Due to this increasing of the turbojet, the space allocated to the heat exchanger 502 is reduced and the air exhaust of the heat exchanger 502 is close to the leading edge of the wing, creating perturbations to the boundary layer.

SUMMARY OF THE INVENTION

An aim of the present invention is to propose an aircraft propulsion system including a heat exchanger system, which is less bulky and thus enables better integration in the propulsion system.

To that effect, an aircraft propulsion system is proposed, the aircraft propulsion system including a turbojet including an intermediate pressure stage and a high-pressure stage, a fan duct, and a heat exchanger system which includes:

- a main heat exchanger including a main hot supply connection, a main hot transfer connection pneumatically connected to the main hot supply connection through the main heat exchanger, a main cold supply connection and a main cold evacuation connection pneumatically connected to the main cold supply connection through the main heat exchanger,
- a supply pipe which is connected to the main hot supply connection, and which supplies the heat exchanger with the hot air, and which includes a regulating valve,
- a high pressure pipe which bleeds hot air from the high-pressure stage through a first valve,
- an intermediate pressure pipe which bleeds hot air from the intermediate pressure stage through a second valve, wherein the high-pressure pipe and the intermediate pressure pipe are connected to the inlet of the regulating valve,
- a transfer pipe which is connected to the main hot transfer connection, and which is adapted to transfer the hot air that has passed through the main heat exchanger to an air management system of the aircraft,
- a main supply pipe which is connected to the main cold supply connection, which supplies the main heat exchanger with cold air from the fan duct, and which includes a main regulating valve,
- an evacuation pipe which is connected to the main cold evacuation connection and is adapted to expel the air to the outside,
- a sub heat exchanger including a sub hot supply connection, a sub hot transfer connection pneumatically connected to the sub supply connection through the sub heat exchanger, a sub cold supply connection and a sub cold evacuation connection pneumatically connected to the sub cold supply connection through the sub heat exchanger, wherein the high pressure pipe issued from the first valve goes through the sub heat exchanger between the sub hot supply connection and the sub hot transfer connection,
- a sub supply pipe which is connected to the sub cold supply connection, which supplies the sub heat exchanger with cold air from the fan duct and which includes a sub regulating valve,
- a sub evacuation pipe which is connected to the sub cold evacuation connection and expels the air to the fan duct,
- a temperature sensor, which measures the temperature of the hot air exiting the main heat exchanger through the transfer pipe, and a control unit which controls the main regulating valve and the sub regulating valve according to the temperature measured by the temperature sensor and the temperature desired for the hot air exiting the main heat exchanger through the transfer pipe, wherein the sub regulating valve comprises a door mounted articulated between a closed position in which it closes the sub supply pipe to prevent the passage of the cold air through the sub supply pipe, and an open position in which it releases the sub supply pipe to authorize the passage of the cold air through the sub supply pipe, a return spring which constrains the door in the open position, and a realizing system, controlled by the control unit, which is mobile between a blocking position in which it blocks the door in the closed position, and a realizing position in which it releases the door which is free to move to the open position.

This embodiment allows a supplementary cold air flow if necessary.

Advantageously, the propulsion system includes a pylon with a primary structure which supports the turbojet, the main heat exchanger is located above the primary structure and in the fan duct and the sub heat exchanger is below the primary structure and in the fan duct.

The invention also proposes an aircraft including at least one propulsion system according to one of the preceding variants.

BRIEF DESCRIPTION OF THE DRAWINGS

The aforementioned characteristics of the invention, as well as others, will emerge more clearly on reading the following description of an embodiment example, the description being made in relation to the attached drawings, among which.

DETAILED DESCRIPTION OF THE PREFERRED EMBODIMENTS

Figure 1:
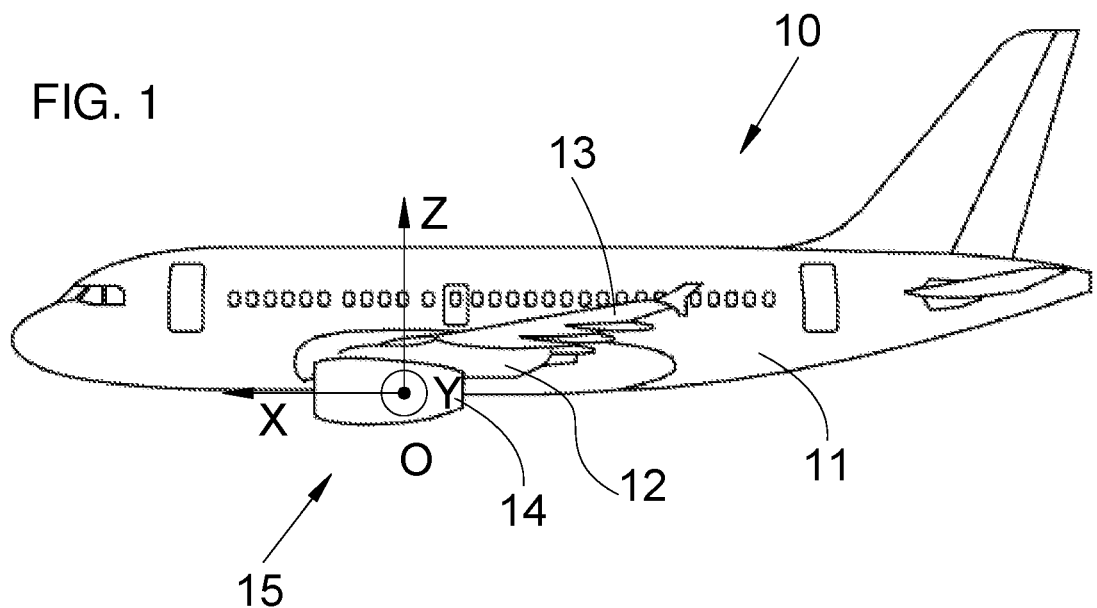
FIG. 1 is a side view of an aircraft including a heat exchanger system according to the invention.
Figure 4:
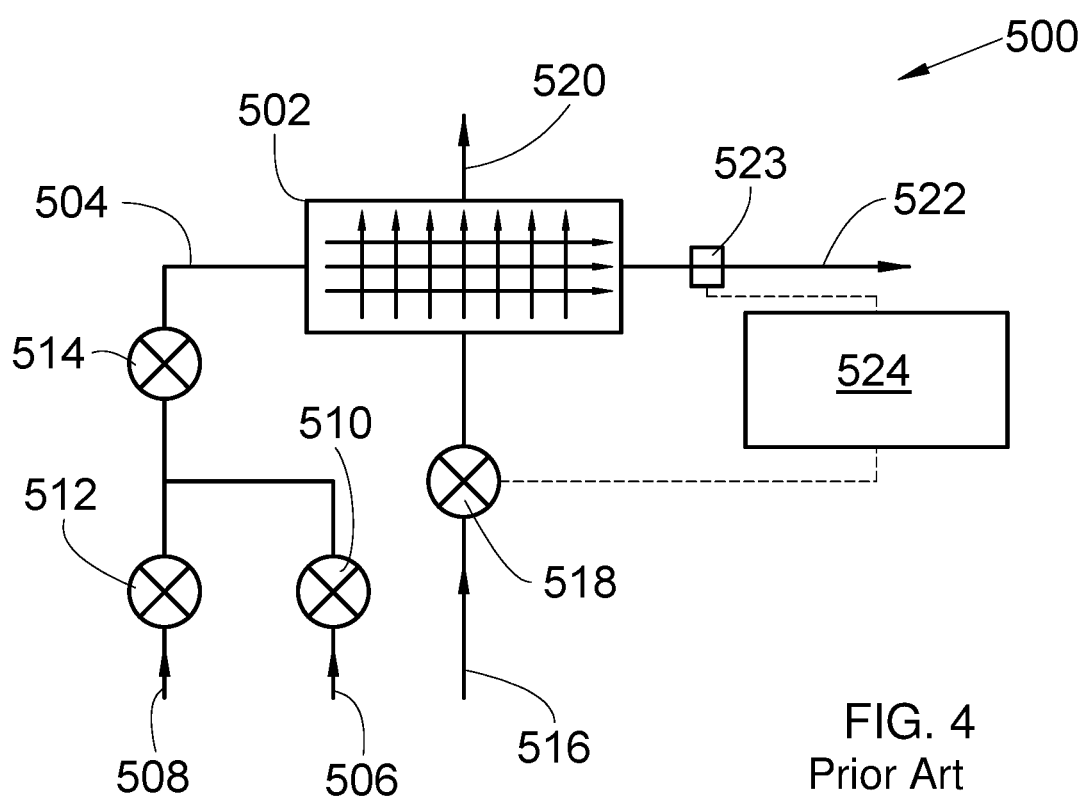
FIG. 4 is a schematic illustration of a heat exchanger system of the state of the art.

In the description that follows, the terms relating to a position are taken with reference to an aircraft in normal flight position, that is to say, as illustrated on FIG. 1, and the positions "forward" and "aft" are taken in relation to the front and rear of the turbojet.

In the description that follows, and by convention, X is the longitudinal axis of the turbojet, which is parallel to the longitudinal axis of the aircraft, Y is the transversal axis, which is horizontal when the aircraft is on the ground, and Z is the vertical axis, which is vertical when the aircraft is on the ground, these three directions X, Y and Z being orthogonal to each other.

Figure 3:
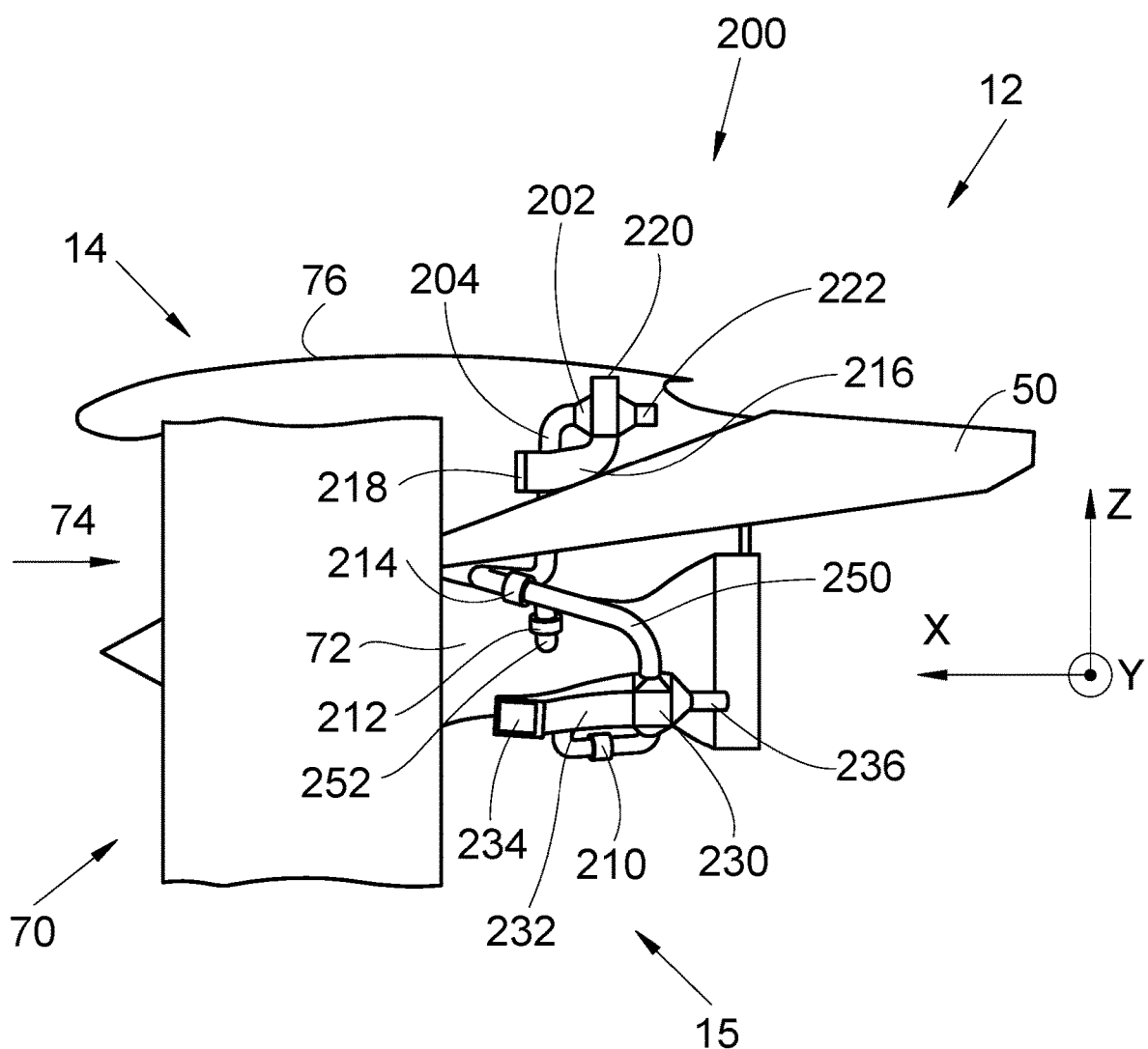
FIG. 3 shows a side view of the heat exchanger system according to the invention in its environment.

FIG. 1 shows an aircraft 10, which includes a fuselage 11, on either side of which a wing 13 is fastened that supports at least one propulsion system 15 which is shown on FIG. 3 and which includes a pylon 12 and a turbojet 70. The pylon 12 is fastened under the wing 13 and supports the turbojet 70, which conventionally includes a compression stage 72 and a fan duct 74. The pylon 12 includes a primary structure 50, which is fastened at its upper part to the structure of the wing 13 and which supports the turbojet 70 through different fastening points. The primary structure 50 is disposed above the turbojet 70 and its front edge is attached to the turbojet 70 inside the fan duct 74.

The compression stage 72 includes a high-pressure stage 206 and an intermediate pressure stage 208. For example, in cruise conditions at 41000 ft, the intermediate pressure at 205° C. is 35 psia, and the high pressure at 517° C. is 174 psia.

The aircraft 10 includes an air management system like, for example, an air conditioning system and/or a de-icing system.

The propulsion system 15 also includes a nacelle 14, which includes a fairing 76, which surrounds the turbojet 70, and an aerodynamic fairing of the pylon 12, which surrounds the primary structure 50.

Figure 2:
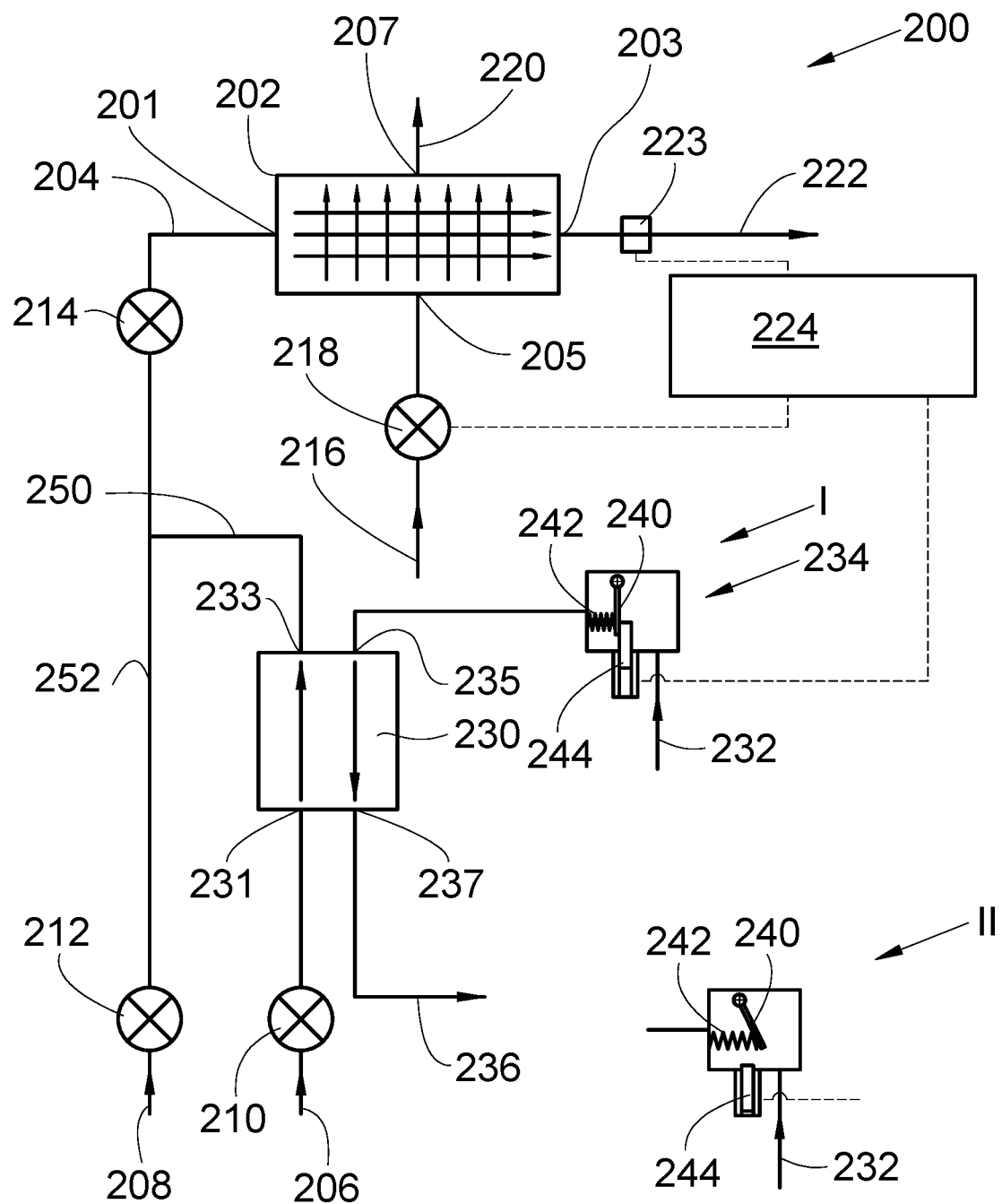
FIG. 2 is a schematic illustration of a heat exchanger system according to the invention.

FIG. 2 shows a heat exchanger system 200 according to the invention.

The heat exchanger system 200 includes a main heat exchanger 202 which comprises a main hot supply connection 201, a main hot transfer connection 203 pneumatically connected to the main supply connection 201 through the main heat exchanger 202, a main cold supply connection 205 and a main cold evacuation connection 207 pneumatically connected to the main cold supply connection 205 through the main heat exchanger 202.

The heat exchanger system 200 includes a supply pipe 204 connected to the main hot supply connection 201 and which supplies the main heat exchanger 202 with hot air and which includes a regulating valve 214, which enables regulation of the pressure at the hot supply connection 201.

The heat exchanger system 200 includes a high-pressure pipe 250 which bleeds hot air from the high-pressure stage 206 through a first valve 210.

The heat exchanger system 200 includes an intermediate pressure pipe 252 which bleeds hot air from the intermediate pressure stage 208 through a second valve 212.

The high-pressure pipe 250 and the intermediate pressure pipe 252 are connected together to the inlet of the regulating valve 214.

The heat exchanger system 200 includes a main supply pipe 216 connected to the main cold supply connection 205 and which supplies the main heat exchanger 202 with cold air and which bleeds cold air from the fan duct 74 of the turbojet 70. The main supply pipe 216 also includes a main regulating valve 218, which regulates the quantity of cold air introduced into the main heat exchanger 202 so as to regulate the temperature of the hot air exiting the main heat exchanger 202.

The heat exchanger system 200 includes an evacuation pipe 220 connected to the main cold evacuation connection 207. After having passed through the main heat exchanger 202, the cold air, which has been heated, is expelled to the outside through the evacuation pipe 220.

The heat exchanger system 200 includes a transfer pipe 222 connected to the main hot transfer connection 203. After having passed through the main heat exchanger 202, the hot air, which has been cooled, is directed through the transfer pipe 222 to the air management systems like the air conditioning system or the de-icing system.

The heat exchanger system 200 includes a temperature sensor 223, which measures the temperature of the hot air exiting the main heat exchanger 202 through the transfer pipe 222 and a control unit 224, or controller, which controls the valves according to the temperature measured by the temperature sensor 223 and the temperature desired for the hot air exiting the main heat exchanger 202 through the transfer pipe 222.

The main heat exchanger 202 is here with cross flows, that is to say, the hot air and the cold air enter the main heat exchanger 202 and exit the main heat exchanger 202 along two globally perpendicular directions. But in another embodiment, the passage of the hot air through the main heat exchanger 202 from the supply pipe 204 to the transfer pipe 222 takes place along a first transfer direction and the passage of the cold air through the main heat exchanger 202 from the main supply pipe 216 to the evacuation pipe 220 takes place along a second transfer direction parallel to the first transfer direction but in the opposite direction.

The heat exchanger system 200 includes also a sub heat exchanger 230 connected between the first valve 210 and the regulating valve 214 on the high-pressure pipe 250.

The sub heat exchanger 230 comprises a sub hot supply connection 231, a sub hot transfer connection 233 pneumatically connected to the sub supply connection 231 through the sub heat exchanger 230, a sub cold supply connection 235 and a sub cold evacuation connection 237 pneumatically connected to the sub cold supply connection 235 through the sub heat exchanger 230.

The high-pressure pipe 250 issued from the first valve 210 goes through the sub heat exchanger 230 between the sub hot supply connection 231 and the sub hot transfer connection 233.

The heat exchanger system 200 includes also a sub supply pipe 232 connected to the sub cold supply connection 235 and which supplies the sub heat exchanger 230 with cold air and which bleeds cold air from the fan duct 74 of the turbojet 70. The sub supply pipe 232 also includes a sub regulating valve 234.

The heat exchanger system 200 includes a sub evacuation pipe 236 connected to the sub cold evacuation connection 237. After having passed through the sub heat exchanger 230, the cold air, which has been heated, is expelled to the fan duct 74 through the sub evacuation pipe 236.

The sub regulating valve 234 takes here the form of a scoop including a door 240 mounted articulated between a closed position in which it closes the sub supply pipe 232 to prevent the passage of the cold air through the sub supply pipe 232, and an open position in which it releases the sub supply pipe 232 to authorize the passage of the cold air through the sub supply pipe 232.

The detail I in FIG. 2 shows the door 240 in the closed position and the detail II in FIG. 2 shows the door 240 in the open position.

The sub regulating valve 234 comprises a return spring 242 which constrains the door 240 in the open position.

The sub regulating valve 234 comprises a realizing system 244 which is mobile between a blocking position in which it blocks the door 240 in the closed position, and a realizing position in which it releases the door 240 which is free to move to the open position.

The realizing system 244 is also controlled by the control unit 224 and is, for example, an electromagnet.

The main heat exchanger 202 is sized for the intermediate pressure stage 208 and for the high-pressure stage 206 and in the normal conditions, the sub heat exchanger 230 is not used.

In the normal conditions, the hot air comes from the intermediate pressure stage 208 and eventually from the high-pressure stage 206, goes through the regulating valve 214 and the main heat exchanger 202. In these conditions, the hot air coming from the high-pressure stage 206 flows through the sub heat exchanger 230 but the door 240 is closed and no cold air flows through the sub heat exchanger 230 to cool the hot air and the regulation is similar to the regulation of the prior art embodiment.

In case of abnormal conditions, when it is necessary to increase the cooling of the hot air coming from the high-pressure stage 206, the control unit 224 commands the realizing system 244 to move it from the blocking position to the realizing position.

Then the door 240 is free to move and the return spring 242 acts on the door 240 to move it into the open position. Thus, additional cold air can be accepted in the sub supply pipe 232 and used in the sub heat exchanger 230.

The return of the door 240 in the closed position can be done manually at the next landing.

In the embodiment shown on FIG. 2, the sub heat exchanger 230 is with cross-flow flows but, in another embodiment, not illustrated, it can be with parallel flows.

FIG. 3 shows the heat exchanger system 200 of the propulsion system 15 in its environment.

The main heat exchanger 202 is located above the primary structure 50 and in the fan duct 74 and the sub heat exchanger 230 is below the primary structure 50 and in the fan duct 74. More precisely, the main heat exchanger 202 is located between the pylon and the pylon fairing.

The primary structure 50 comprises a window through which the supply pipe 204 goes through to connect itself with the high-pressure pipe 250 and the intermediate pressure pipe 252.

In the embodiment shown on FIG. 3, the regulating valve 214 is also arranged below the primary structure 50.

The main regulating valve 218 can take also the form of a scoop including a door, which is mobile between an open position in which it does not blank off the scoop and a closed position in which it blanks off the scoop so as to regulate the quantity of cold air captured by the scoop. The door is motorized so as to ensure its movement and the motor is controlled by the control unit 224 and the door acts as a valve.

Each scoop is oriented so as to be able to capture the cold air that circulates in the fan duct 74.

The new implementation allows a design of the main heat exchanger with low bleed air side pressure drop. This lower pressure drop allows an improvement engine start performance due to higher pressure delivered to the starter turbine, a higher inlet pressure to air conditioning pack allowing the pack to operate with less ram air and thus reducing induced ram drag, and the challenging of the position of the intermediate pressure stage port, using a lower compressor stage that improves engine specific fuel consumption.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion system of an aircraft, said propulsion system including a turbojet including an intermediate pressure stage and a high-pressure stage, a fan duct, and a heat exchanger system, which includes:
- a main heat exchanger including a main hot supply connection, a main hot transfer connection pneumatically connected to the main hot supply connection through the main heat exchanger, a main cold supply connection and a main cold evacuation connection pneumatically connected to the main cold supply connection through the main heat exchanger,
- a supply pipe which is connected to the main hot supply connection, and which supplies the main heat exchanger with hot air, and which includes a regulating valve,
- a high-pressure pipe which bleeds the hot air from the high-pressure stage through a first valve,
- an intermediate pressure pipe which bleeds the hot air from the intermediate pressure stage through a second valve, wherein the high-pressure pipe and the intermediate pressure pipe are connected to an inlet of the regulating valve,
- a transfer pipe which is connected to the main hot transfer connection, and which is configured to transfer the hot air that has passed through the main heat exchanger to an air management system of the aircraft,
- a main supply pipe which is connected to the main cold supply connection, which supplies the main heat exchanger with cold air from the fan duct, and which includes a main regulating valve,
- a main evacuation pipe which is connected to the main cold evacuation connection and is configured to expel the cold air to an outside,
- a sub heat exchanger including a sub hot supply connection, a sub hot transfer connection pneumatically connected to the sub hot supply connection through the sub heat exchanger, a sub cold supply connection and a sub cold evacuation connection pneumatically connected to the sub cold supply connection through the sub heat exchanger, wherein the high pressure pipe issued from the first valve goes through the sub heat exchanger between the sub hot supply connection and the sub hot transfer connection,
- a sub supply pipe which is connected to the sub cold supply connection, which supplies the sub heat exchanger with the cold air from the fan duct and which includes a sub regulating valve,
- a sub evacuation pipe which is connected to the sub cold evacuation connection and expels the cold air to the fan duct,
- a temperature sensor, which measures a temperature of the hot air exiting the main heat exchanger through the transfer pipe, and
- a controller which controls the main regulating valve and the sub regulating valve according to the temperature measured by the temperature sensor and a temperature desired for the hot air exiting the main heat exchanger through the transfer pipe,
- wherein the sub regulating valve comprises a door mounted articulated between a closed position in which the door closes the sub supply pipe to prevent passage of the cold air through the sub supply pipe, and an open position in which the door releases the sub supply pipe to authorize the passage of the cold air through the sub supply pipe, a return spring which constrains the door in the open position, and a realizing system, controlled by the controller, which is mobile between a blocking position in which the realizing system blocks the door in the closed position, and a realizing position in which the realizing system releases the door which is free to move to the open position.

2. The propulsion system according to claim 1, further including a pylon with a primary structure, which supports the turbojet, wherein the main heat exchanger is located above the primary structure and in the fan duct and wherein the sub heat exchanger is below the primary structure and in the fan duct.

3. An aircraft including at least one propulsion system, said at least one propulsion system including a turbojet including an intermediate pressure stage and a high-pressure stage, a fan duct, and a heat exchanger system, which includes:
- a main heat exchanger including a main hot supply connection, a main hot transfer connection pneumatically connected to the main hot supply connection through the main heat exchanger, a main cold supply connection and a main cold evacuation connection pneumatically connected to the main cold supply connection through the main heat exchanger,
- a supply pipe which is connected to the main hot supply connection, and which supplies the main heat exchanger with hot air, and which includes a regulating valve,
- a high-pressure pipe which bleeds the hot air from the high-pressure stage through a first valve,
- an intermediate pressure pipe which bleeds the hot air from the intermediate pressure stage through a second valve, wherein the high-pressure pipe and the intermediate pressure pipe are connected to an inlet of the regulating valve,
- a transfer pipe which is connected to the main hot transfer connection, and which is configured to transfer the hot air that has passed through the main heat exchanger to an air management system of the aircraft,
- a main supply pipe which is connected to the main cold supply connection, which supplies the main heat exchanger with cold air from the fan duct, and which includes a main regulating valve,
- a main evacuation pipe which is connected to the main cold evacuation connection and is configured to expel the cold air to an outside,
- a sub heat exchanger including a sub hot supply connection, a sub hot transfer connection pneumatically connected to the sub hot supply connection through the sub heat exchanger, a sub cold supply connection and a sub cold evacuation connection pneumatically connected to the sub cold supply connection through the sub heat exchanger, wherein the high pressure pipe issued from the first valve goes through the sub heat exchanger between the sub hot supply connection and the sub hot transfer connection,
- a sub supply pipe which is connected to the sub cold supply connection, which supplies the sub heat exchanger with the cold air from the fan duct and which includes a sub regulating valve,
- a sub evacuation pipe which is connected to the sub cold evacuation connection and expels the cold air to the fan duct,
- a temperature sensor, which measures a temperature of the hot air exiting the main heat exchanger through the transfer pipe, and
- a controller which controls the main regulating valve and the sub regulating valve according to the temperature measured by the temperature sensor and a temperature desired for the hot air exiting the main heat exchanger through the transfer pipe, wherein the sub regulating valve comprises a door mounted articulated between a closed position in which the door closes the sub supply pipe to prevent passage of the cold air through the sub supply pipe, and an open position in which the door releases the sub supply pipe to authorize the passage of the cold air through the sub supply pipe, a return spring which constrains the door in the open position, and a realizing system, controlled by the controller, which is mobile between a blocking position in which the realizing system blocks the door in the closed position, and a realizing position in which the realizing system releases the door which is free to move to the open position.

\* \* \* \* \*